(12) United States Patent
Piemonte et al.

(10) Patent No.: US 11,953,339 B2
(45) Date of Patent: Apr. 9, 2024

(54) SYSTEMS AND METHODS FOR GENERATING AN INTERACTIVE USER INTERFACE

(71) Applicant: Apple Inc., Cupertino, CA (US)

(72) Inventors: Patrick S. Piemonte, San Francisco, CA (US); Jason D. Gosnell, San Jose, CA (US); Kjell F. Bronder, San Francisco, CA (US); Daniel De Rocha Rosario, San Francisco, CA (US); Shaun D. Budhram, San Jose, CA (US); Scott Herz, San Jose, CA (US)

( * ) Notice: Subject to any disclaimer, the term of this patent is extended or adjusted under 35 U.S.C. 154(b) by 228 days.

(21) Appl. No.: 17/182,736

(22) Filed: Feb. 23, 2021

(65) Prior Publication Data

US 2021/0247203 A1    Aug. 12, 2021

Related U.S. Application Data

(63) Continuation of application No. 15/762,347, filed as application No. PCT/US2016/052779 on Sep. 21, 2016, now Pat. No. 10,976,178.

(Continued)

(51) Int. Cl.
*G01C 21/36* (2006.01)
*G05D 1/00* (2006.01)

(52) U.S. Cl.
CPC ..... *G01C 21/3697* (2013.01); *G01C 21/3664* (2013.01); *G01C 21/3667* (2013.01);
(Continued)

(58) Field of Classification Search
CPC ............ G01C 21/3697; G01C 21/3664; G01C 21/3667; G01C 21/367; G05D 1/0088; G05D 1/0212
See application file for complete search history.

(56) References Cited

U.S. PATENT DOCUMENTS 8,903,650 B2   12/2014   Kazawa et al.
10,976,178 B2 *  4/2021   Piemonte ........... G01C 21/3697
(Continued)

FOREIGN PATENT DOCUMENTS

CN    102589561    7/2012
CN    102878998    1/2013
(Continued)

OTHER PUBLICATIONS

Linder, Brad, "Google introduces Android Auto," Jun. 25, 2014, https://liliputing.com/2014/06/google-introduces-android-auto.html, accessed Mar. 21, 2018.

(Continued)

*Primary Examiner* — Donald J Wallace
(74) *Attorney, Agent, or Firm* — Polsinelli PC

(57) ABSTRACT

Implementations described and claimed herein provide systems and methods for interaction between a user and a machine. In one implementation, machine status information for the machine is received at a dedicated machine component. The machine status information is published onto a distributed node system network of the machine. The machine status information is ingested at a primary interface controller, and an interactive user interface is generated using the primary interface controller. The interactive user interface is generated based on the machine status information. In some implementations, input is received from the user at the primary interface controller through the interactive user interface, and a corresponding action is delegated to one or more subsystems of the machine using the distributed node system network.

20 Claims, 12 Drawing Sheets

Related U.S. Application Data

(60) Provisional application No. 62/232,322, filed on Sep. 24, 2015.

(52) U.S. Cl.
CPC ......... *G01C 21/367* (2013.01); *G05D 1/0088* (2013.01); *G05D 1/0212* (2013.01)

(56) References Cited

U.S. PATENT DOCUMENTS

| | | |
|---|---|---|
| 2008/0162033 A1 | 7/2008 | Wagner et al. |
| 2010/0030612 A1 | 2/2010 | Kim et al. |
| 2012/0209506 A1 | 8/2012 | Tamayama et al. |
| 2013/0226441 A1* | 8/2013 | Horita .................... B60Q 9/00 701/117 |
| 2013/0332074 A1 | 12/2013 | Rhee et al. |
| 2014/0026088 A1 | 1/2014 | Monte |
| 2015/0241239 A1 | 8/2015 | Van Dok et al. |
| 2015/0319093 A1 | 11/2015 | Stolfus |
| 2017/0219364 A1 | 8/2017 | Lathrop et al. |
| 2018/0143639 A1 | 5/2018 | Singhal et al. |
| 2019/0219417 A1 | 7/2019 | Quint |
| 2019/0324600 A1 | 10/2019 | Wipperfurth |

FOREIGN PATENT DOCUMENTS

| | | |
|---|---|---|
| CN | 103727949 | 4/2014 |
| EP | 2150034 | 2/2010 |
| EP | 1921421 | 5/2018 |
| WO | WO 2014/139821 | 9/2014 |

OTHER PUBLICATIONS

Thomas, Kevin, "Android Auto: Everything you need to know," Feb. 3, 2015, https://3g.co.uk/quides/android-auto-everything-you-need-to-know, accessed Mar. 21, 2018.

"The Near Future of In-Car HMI," ustwo Auto, Jul. 14, 2014, http://ustwo.com/blog/the-near-future-of-in-car-hmi/, accessed Mar. 21, 2018.

\* cited by examiner

SYSTEMS AND METHODS FOR GENERATING AN INTERACTIVE USER INTERFACE

CROSS-REFERENCE TO RELATED APPLICATIONS

The present application is a continuation of U.S. Patent Application No. entitled "Systems and Methods for Generating an Interactive User Interface" and filed on Mar. 22, 2018, which is a 371 of PCT Patent Application No. PCT/US2016/052779, entitled "Systems and Methods for Generating an Interactive User Interface" and filed on Sep. 21, 2016, which claims priority to U.S. Provisional Application No. 62/232,322, entitled "Systems and Methods for Generating an Interactive User Interface" and filed on Sep. 24, 2015, each of which is specifically incorporated by reference herein in its entirety.

FIELD

Aspects of the present disclosure relate to an interactive user interface for a machine and more particularly to an interactive user interface providing information relating to operation of an autonomous machine.

BACKGROUND

Autonomous machines, including robots, aerial vehicles, aerospace vehicles, submersible vehicles, automobiles, other ground vehicles, and the like, are capable of operating within their respective environments with limited input from a user. Conventional autonomous machines generally fail to compensate for this lack of operational engagement between the user and the autonomous machine. As a result, the user may be unaware of future actions planned by the autonomous machine and/or lack an understanding of a basis of a decision or action of the autonomous machine, which may unnecessarily decrease a confidence of the user in the autonomous machine or otherwise make the user uneasy. It is with these observations in mind, among others, that various aspects of the present disclosure were conceived and developed.

SUMMARY

Implementations described and claimed herein address the foregoing problems by providing systems and methods for interaction between a user and a machine. In one implementation, machine status information for the machine is received at a dedicated machine component. The machine status information is published onto a distributed node system network of the machine. The machine status information is ingested at a primary interface controller, and an interactive user interface is generated using the primary interface controller. The interactive user interface is generated based on the machine status information. In some implementations, input is received from the user at the primary interface controller through the interactive user interface, and a corresponding action is delegated to one or more subsystems of the machine using the distributed node system network.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and methods for interaction between a user and a machine, such as an autonomous machine. Generally, a primary interface controller generates an interactive user interface for interaction between the user and the machine. The interactive user interface facilitates user understanding of statuses, actions, and decisions of the machine, while permitting the user to impact or control various operations of the machine. For example, the interactive user interface may permit the user to dynamically modify a route of the machine along a path of travel. In one particular aspect, the interactive user interface includes a timeline, a communication layer, and indications to provide simple and intuitive means for the user to interact with and understand the machine.

The various systems and methods disclosed herein generally provide for interaction between a user and a machine. The example implementations discussed herein reference an interactive user interface for a manned autonomous vehicle for transporting a user. However, it will be appreciated by those skilled in the art that the presently disclosed technology is applicable in other human machine interface (HMI) contexts and to other manned and unmanned autonomous machines, including, without limitation, robots, aerial vehicles, aerospace vehicles, submersible vehicles, ground vehicles, and the like. The presently disclosed technology may be further applicable to other types of machines and user devices, such as a personal computer, workstation, terminal, mobile device, smartphone, tablet, multimedia console, and other computing devices.

Figure 1:
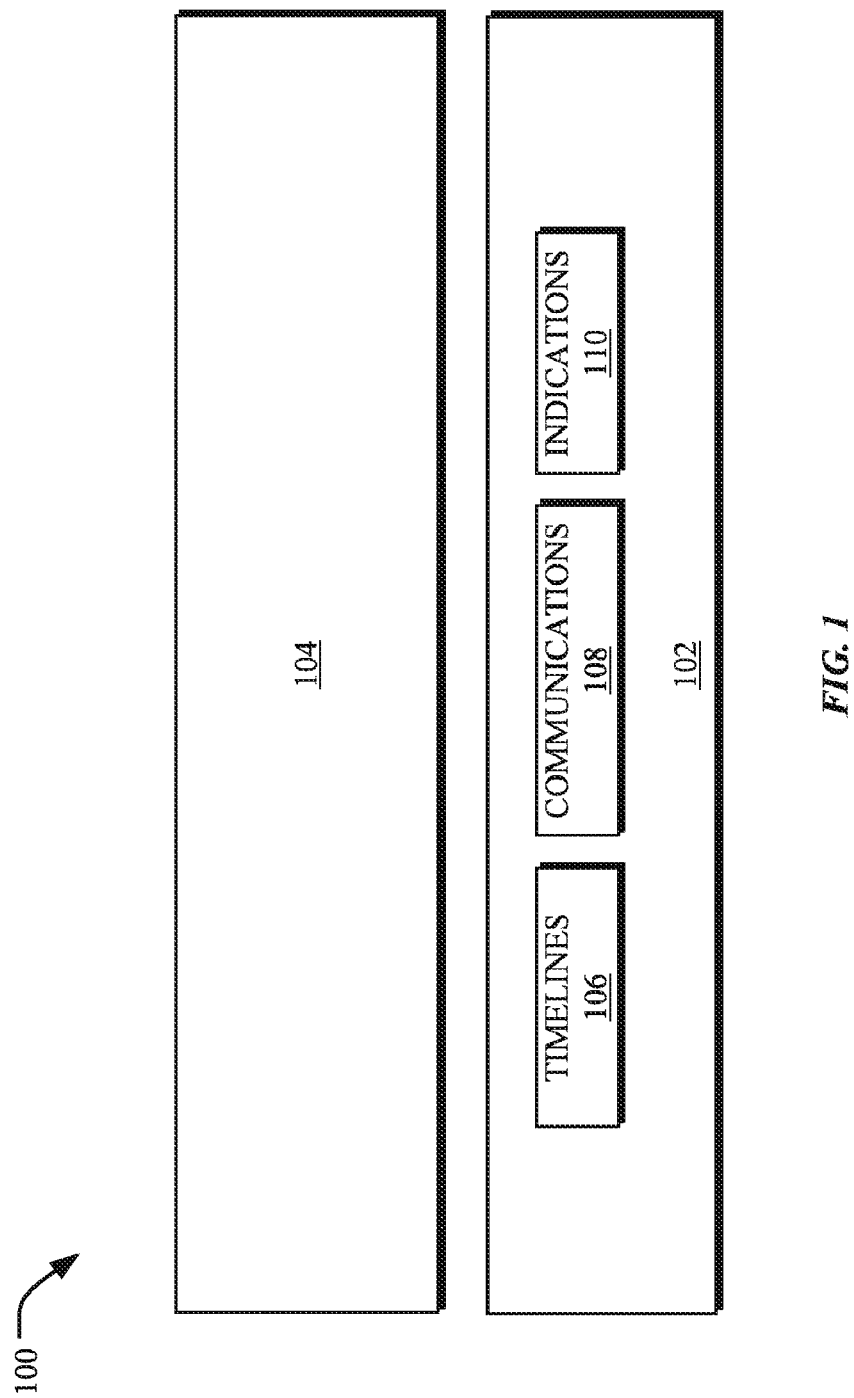
FIG. 1 is a diagram of an example interactive user interface for an autonomous machine.

FIG. 1 is a diagram of an example interactive user interface 100 for an autonomous machine, such as an autonomous vehicle for transporting one or more users along a travel path. Autonomous vehicles are capable of operating to move along the travel path with limited user input. Stated differently, rather than the user being operationally engaged to control the actions of the autonomous vehicle, the user may provide instructions, such as one or more destination points, and the autonomous vehicle transports the user to the selected destination points through a series of autonomous decisions.

While the user may understand that the autonomous vehicle is transporting the user along a travel path to the selected destination, the user may not know details of the travel path, future actions planned by the autonomous vehicle, a basis of past and current autonomous decisions, a status of various subsystems of the autonomous vehicle, and/or the like. Further, the user may desire to change the selected destination points or otherwise modify the travel path, which may be conventionally discouraging or overwhelming given a complexity of autonomous vehicle operation. As such, the interactive user interface 100 is generated to facilitate interactions between the user and the machine.

In one implementation, the interactive user interface 100 is deployed in a cockpit and/or a passenger section of an autonomous vehicle, thereby facilitating interactions with one or more users during transport of the users. In another implementation where the autonomous vehicle is unmanned or otherwise remotely operated, the interactive user interface 100 is deployed at central location removed from the autonomous vehicle, such as a transportation control center or other command center. The interactive user interface 100 may also be provided via a user device for remote or local interactions between users and the autonomous vehicle.

The interactive user interface 100 may be presented in various manners using a variety of input and output devices, as described herein. For example, the interactive user interface 100 may be presented as an interactive dashboard interface, an interactive window interface, an interactive heads-up-display interface, and/or the like. Interface elements may be presented at various portions of the interfaces. For example, interface elements may be presented at a bottom or side of a heads-up-display interface. In one implementation, the interactive user interface 100 includes an interactive dashboard interface 102 and an interactive window interface 104, as illustrated in FIG. 1. Each of the interactive interfaces 102 and 104 are configured for various forms of input and output, including visual, audio, tactile, and/or the like.

The interactive dashboard interface 102 provides an instrument panel that may be used to control operation of the autonomous vehicle and obtain information related thereto. In one implementation, the interactive dashboard interface 102 is a tactile touch screen display configured to receive tactile input from one or more users and display visual output. The interactive dashboard interface 102 may further be configured to receive visual input in the form of gesture commands from the user, audio input in the form of voice commands from the user, and other tactile input. Similarly, the interactive dashboard interface 102 may be configured to provide other visual, audio, or tactile output.

The interactive window interface 104 provides a view of an environment external to the autonomous vehicle. The view may be a live direct view through a transparent cover disposed in an opening in the autonomous vehicle, such as a windshield, window, porthole, door, and/or the like. The view may alternatively be a live indirect view reproduced using one or more output devices. In one implementation, the interactive window interface 104 provides an augmented reality where the external environment is interactive and digitally manipulable. Stated differently, the interactive window interface 104 may utilize augmented reality techniques, along with computer vision techniques, to modify one or more elements in the external environment and/or to overlay interactive features or information. Additionally or alternatively, the interactive window interface 104 may create an artificial or simulated environment, for example, to learn how to drive.

The interactive user interface 100 includes one or more interactive features generated based on machine status information. The machine status information may include, without limitation, navigation information, vehicle motion information, vehicle perception information, vehicle status information, vehicle environment information, and/or the like. The navigation information may include any information pertain to a travel path of the machine from an origination point to one or more destination points. For example, the navigation information may include, without limitation, mapping information; location information; environmental condition information, such as traffic information, obstacle information, weather information, road closure information; and/or the like.

The vehicle motion information includes data pertaining to movement of the autonomous vehicle, such as location information, inertial information, and kinetics. The vehicle perception information provides a perception of the autonomous vehicle relative to a notion of the external environment and may be generated based on raw data of the external environment captured with one or more sensors. The vehicle status information pertains to a status of each of the subsystems of the vehicle. For example, the vehicle status information may indicate an operational status of various engine components, fuel level, battery charge, tire pressure, window orientation (e.g., open or closed), and statuses of other interior and exterior components. The vehicle environment information relates to interior vehicle services, such as climate control, music and sound control, seat orientation, and other user experience services.

The interactive features of the interactive user interface 100 may further be generated based on user status information for one or more users. The user status information may include, without limitation, a user travel history (e.g., where the user has been), user travel plans (e.g., a scheduled flight), calendar events, user activity (e.g., exercise), user tasks (e.g., picking up a prescription), user contacts, and the like. Each of the users may be manually selected or automatically detected with interactive user interface 100. For example, the users may manually select a user profile with the interactive dashboard interface 102. Alternatively or additionally, the interactive user interface 100 may identify the users through connected user devices (e.g., a smartphone connected over Bluetooth® to the interactive user interface 100) or using user identifying techniques (e.g., facial recognition, voice recognition, fingerprint recognition, etc.).

In one implementation, the interactive user interface 100 distinguishes between users to provide customized interactive features. For example, the interactive user interface 100 may distinguish between users present in the autonomous vehicle to customize the interactive features for a primary user (e.g., an operator or driver). The interactive user interface 100 may further provide various combinations of customized interactive features for the users, permitting the users to interact with overlapping content (e.g., a common travel path or plans), toggle between individual content, or some combination of both. The interactive user interface 100 may further present customized interactive features for a particular user within the field of view for the particular user, while providing customized interactive features for another user in a field of view for the other user.

In one implementation, the interactive features included in the interactive user interface 100, include, without limitation, one or more timelines 106, a communications layer 108, and one or more indications 110. The interactive features 106-110 are illustrated in FIG. 1 as being presented by the interactive dashboard interface 102, but it will be appreciated that the interactive features 106-110 may be provided via the interactive window interface 104 or other aspects of the interactive user interface 100.

The timelines 106 presents one or more travel paths for the autonomous vehicle and/or each of the users. In one implementation, the timeline 106 provides an interactive representation of a trip encompassing an origination point, one or more destination points, and any events or modifications possible along a travel path for the trip. Stated differently, the timeline 106 abstracts away complex routing information and details of vehicle motion to provide a simplified representation of a trip with arrival information. The timeline 106 thus provides an intuitive interface tied to control of complex subsystems of the autonomous vehicle that the user may interact with to initiate or dynamically modify a travel path for a trip, while providing insight into decisions of the autonomous vehicle.

In one implementation, the timeline 106 provides the user with a visual representation of a current progress of the autonomous vehicle along a travel path, as well as a duration until each selected destination point. The timeline 106 may represent the duration by scaling the timeline 106 and/or displaying an estimated time of arrival at each of the selected destination points. The timeline 106 thus provides a schedule of destination points, compounding the estimated time of arrival across all the selected destination points to the final destination point, while tracking a current progress. The timeline 106 displays an updated estimated time of arrival for each of the selected destination points in real time based on the addition or removal of destination points, the presence of travel conditions, and/or the like.

The timeline 106 may further indicate opportunities for rerouting the travel path, notify the user of travel conditions, such as upcoming traffic congestion, upcoming obstacles, inclement weather, upcoming road closures, delays pertaining to the travel path of the machine, user travel information (e.g., flight status, reservations, etc.), and/or the like. The opportunities for rerouting may be provided in response to: a travel condition, a vehicle necessity, user input, user preferences, and/or related to an autonomous decision of the vehicle. For example, the timeline 106 may provide one or more options to reroute to avoid upcoming heavy traffic or otherwise inform the user that the vehicle has made an autonomous decision to modify the travel path based on the upcoming heavy traffic. Similarly, if the vehicle is running low on battery charge, the timeline 106 may provide options for charging stations in a proximity of the vehicle for selection or otherwise inform the user that the vehicle has made an autonomous decision to add a charging station as a waypoint destination.

In one implementation, the timeline 106 represents an upcoming schedule of autonomous decisions by the vehicle, actions that will be taken by the vehicle based on user input and/or autonomous decisions, and/or other events or actions. For example, if the vehicle is being manually driven and can transition into an autonomously driven mode, the point of transition may be presented via the timeline 106. Similarly, the timeline 106 may distinguish spans of travel at which the drive is autonomous from spans of travel at which the drive is manual or semi-autonomous. For example, the spans of travel may be distinguished through color coding and/or other visual representations.

The user input may override an autonomous decision of the vehicle, add or drop destination points, or otherwise modify the travel path. In one implementation, one or more opportunities for rerouting are automatically generated based on user preferences. For example, the user may indicate a preference for stopping for coffee during a certain timeframe (e.g., morning) or on the way to particular destination (e.g., work), so the timeline 106 may provide options for coffee shops. Similarly, the user may indicate a preference for various points-of-interest, so the timeline 106 may notify the user of any points-of-interest within a proximity of the travel path.

In one exemplary implementation, the timeline 106 displays graphics for the user to interact with to initiate or modify the travel path. For example, a final destination point may be entered by dragging a search result onto the timeline 106 or tapping the end of the timeline 106. The timeline 106 may propose a plurality of routes to the final destination point, permitting the user to select a preferred path. For example, the timeline 106 may provide options including a route that is longer in total duration but during which the vehicle would be able to drive autonomously longer.

Other destination points (i.e., waypoint destinations) along the travel path to the final destination point may be similarly modified by adding results to or removing results from the timeline 106. An alert may appear in the timeline 106 if a travel condition emerges or to provide options for rerouting. The timeline 106 thus permits the user to manage the travel path in real time and easily delegate actions to complex subsystems of the autonomous vehicle accordingly.

The communications layer 108 generally provides an integrated presentation with messages representing complex subsystems. In other words, the communications layer 108 provides a simplified and intuitive conversational user interface informing the user of the statuses and autonomous decisions of the vehicle and facilitating interaction of the user with the various complex subsystems of the vehicle. In one implementation, the communications layer 108 has a representation of a conversation between the user and the vehicle as a single entity through spoken words, visual messages, hand gestures, and/or the like. For example, the user may type a message or speak a message to the vehicle, and the vehicle may respond with a visual message or an audible message. The communications layer 108 thus capitalizes on the familiarity and comfort of conversation to transcend boundaries of complexity of the autonomous vehicle to facilitate control and understanding for the user.

In one exemplary implementation, the communications layer 108 displays interactive chat bubbles representing messages exchanged between the user and the vehicle. The chat bubbles may include text, graphics, animation, or other visual features. In one implementation, the chat bubbles provide a history of exchanged messages permitting the user to scroll through the history. For example, the history may include a history of vehicle subsystems statuses and a history of autonomous decisions. The chat bubbles may be presented in a collection of views distinguishing between messages on behalf of the vehicle and messages representing various users. For example, the chat bubbles may be color coded or positioned with vehicle messages on one side and user messages on the other side. Similarly, the messages may be categorized allowing the user to swipe between conversation types, such as music or other media selection, climate control, navigation, vehicle subsystems statuses, alerts, settings, and the like.

The communications layer 108 may include options for the user to select from or refine or otherwise permit the user to obtain machine status information or user status information through a simulated conversation with the vehicle. The communications layer 108 may communicate to the user that the vehicle is in the process of acting upon a user request, obtaining information, or performing a complex autonomous decision. For example, during such scenarios, the chat bubbles may display an ellipsis symbol or an animation until the information is available to provide to the user.

In one implementation, feedback on messages generated by the vehicle may be provided via the communications layer 108. For example, the user may tap the message a number of times to rate a quality of the message. The communications layer 108 increments a count to learn preferences of the user to provide messages and options liked by the user.

The indications 110 inform the user of location, motion, and activity of the autonomous vehicle. In one implementation, the indications 110 vary depending on whether the autonomous vehicle is operating in a manual mode controlled by the user, a semiautonomous mode, or a fully autonomous mode. In a manual mode, the indications 110 may be tailored to prevent distraction to a driver. In a semiautonomous or fully autonomous mode, the indications 110 may passively inform the users of autonomous decisions by the vehicle and prepare the users for upcoming movements of the vehicle. The indications 110 thus improve user comfort and confidence in the autonomous decisions of the vehicle.

In one implementation, the indications 110 emphasize upcoming actions to prepare the users for change or other action. The indications 110 may include action indications and gradual indications to properly prepare the users based on the upcoming action. Action indications correspond to one or more specific upcoming actions. For example, the indications 110 may provide action indications to prepare the users for an upcoming turn, approaching obstacle, or other action or series of actions. Gradual indications inform the users of actions occurring over a duration through ever-present representation that changes over the course of the duration. For example, the indications 110 may provide gradual indications representing a current progress along a travel path with the representation changing gradually with respect to distance traveled and/or proximity to a destination point.

The indications 110 leverage all the senses of the users to passively communicate one or more actions of the autonomous vehicle to the users, including location, motion, and activity. Stated differently, the indications 110 may be output as visual, audio, and/or tactile indications. For example, the indications 110 may provide an action indication as the vehicle is approaching a turn in the form of lights displayed along a side of the vehicle corresponding to a direction of the turn and/or playing a tone on the side of the vehicle corresponding to the turn direction. As another example of an action indication for an approaching turn, the indications 110 may indicate the approaching turn by turning a wheel representation on the interactive dashboard interface 102 in the turn direction. Where the vehicle is approaching an obstacle, the indications 110 may provide an action indication by displaying a yellow light and/or tightening a grip on the users through the seats until the obstacle is passed. As an example of a gradual indication, the indications 110 may represent a current status of progress along a travel path by displaying one color at the beginning of a trip and transitioning to another color as the vehicle moves along the travel path to the destination point. Here, the indications 110 may provide a blue light in the interior at a start of a trip and gradually change the color to green as the trip progresses towards the destination point. The indications 110 may similarly change color or otherwise announce when transitioning from driving mode to parking mode.

Thus, the interactive user interface 100 generally provides user centric autonomy for the vehicle as an ever present entity communicating status, action, and decisions of the vehicle, as well as facilitating control of complex subsystems of the vehicle.

Figure 2:
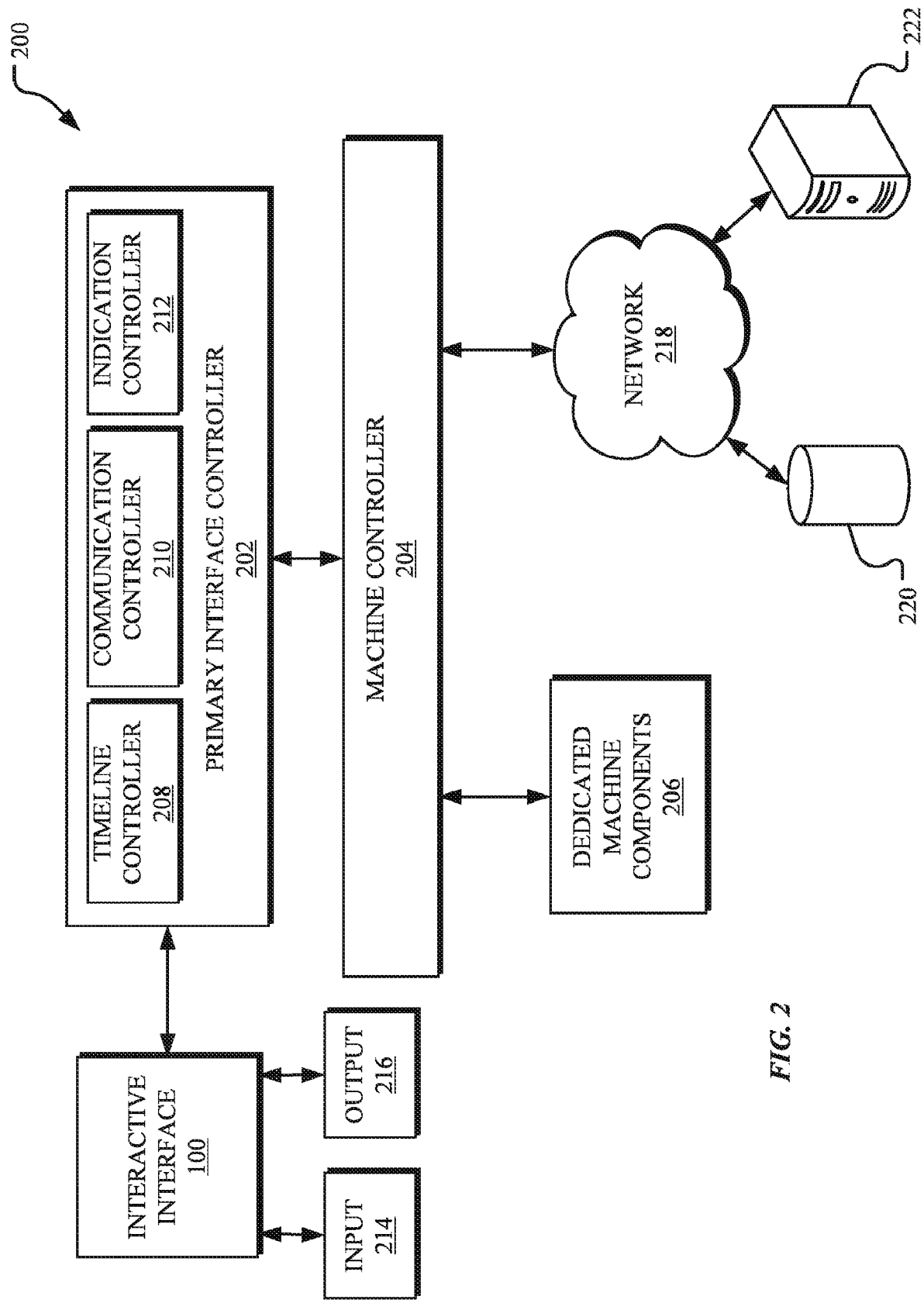
FIG. 2 illustrates an example system for generating the interactive user interface.

Turning to FIG. 2, an example system 200 for generating the interactive user interface 100 is shown. In one implementation, the system 200 includes a primary interface controller 202 in communication with a plurality of dedicated machine components 206 over a machine controller 204. Each of the dedicated machine components 206 may have a primary function for the vehicle. However, it will be appreciated that while each dedicated machine component 206 has a primary function, it may also have additional functions as well.

In one implementation, the machine controller 204 is a dedicated node system network where the primary interface controller 202 and the dedicated machine components 206 communicate based on their own needs. For example, the machine controller 204 may utilize a publisher-subscriber architecture involving a messaging pattern where messages are published to the machine controller 204 and characterized into classes. The primary interface controller 202 and each of the dedicated machine components 206 may subscribe to any of the classes to receive corresponding messages. Thus, the primary interface controller 202 may receive machine status information and/or user status information without knowledge of what publishers, if any, exist. Similarly, the primary interface controller 202 may publish messages to the machine controller 204 without knowledge of what subscribers, if any, exist. It will be appreciated that other architectures providing a communication channel for the primary interface controller 202 and the dedicated machine components 206 may be deployed in the machine controller 204.

The primary interface controller 202 is configured to generate the interactive user interface 100 based on machine status information and/or user status information obtained via the machine controller 204. In one implementation, the primary interface controller 202 includes a timeline controller 208 configured to generate the timelines 106, a communications controller 210 configured to generate the communications layer 108, and an indication controller 212 configured to generate the indications 110.

In one implementation, to permit interaction with the user via the interactive user interface 100, the dedicated machine components 206 register with the primary interface controller 202. The dedicated machine components 206 are each responsible for one or more services for the autonomous vehicle and/or in communication with one or more subsystems of the autonomous vehicle. For example, the dedicate machine components 206 may include navigation component(s), vehicle motion components, vehicle perception components, vehicle status components, vehicle environment components, and/or the like.

The machine controller 204 may further obtain machine status information, user status information, and/or other raw or processed data over a network 218. In one implementation, the network 218 is used by one or more computing or data storage devices, including one or more databases 220, for remote interaction with the interactive user interface 100. A server 222 may also host a website or an application that users visit to access information stored in the databases 220 and/or for remote interaction with the interactive user interface 100. The server 22 may be one single server, a plurality of servers with each such server being a physical server or a virtual machine, or a collection of both physical servers and virtual machines. In another implementation, a cloud hosts one or more network components. The machine controller 204, the server 222, and other resources, such as the database 220 or user devices, connected to the network 218 may access one or more other servers for access to one or more websites, applications, web services interfaces, and/or the like for access to user status information, machine status information, and/or other services or information. The server 222 may also host a search engine for accessing and modifying such information.

To interact with the user via the interactive user interface 100, one or more input devices 214 and output devices 216 are employed. The input devices 214 may be generally any form of input device in communication (wired or wireless) with the primary interface controller 202 and configured to capture raw data in the form of visual, audio, and/or tactile input. For example, the input devices 214 may include one or more sensors, user devices, and/or the like. The user device is generally any form of computing device, such as a computer, mobile device, smartphone, tablet, multimedia console, vehicle interface console, and/or the like. The sensors may include without limitation microphones, imagers, touchscreen sensors (e.g., resistive, surface acoustic, capacity, infrared (IR), optical, pressure, etc.) In one implementation, the input devices 214 project a signal, such as visible light, invisible light (e.g., IR light), acoustic waves, and/or the like, into a field of view. The signal is reflected from the field of view and detected by one or more sensors in the input devices 214. It will be appreciated that the input devices 214 and/or the primary interface controller 202 may employ various visual, audio, and tactile processing techniques to ingest input from the user captured by the input devices 214.

Similarly, the output devices 216 may be generally any form of output device in communication (wired or wireless) with the primary interface controller 202 and configured to provide visual, audio, and/or tactile output. The output devices 216 may include, without limitation, displays, projectors, speakers, light sources, haptic devices, user devices, and/or the like. In some implementations, the output devices 216 are integrated into components of the autonomous vehicle (e.g., in the seats, steering wheel, etc.).

In an example implementation, a user may modify a travel path of the autonomous vehicle by interacting with the timeline 106 using at least one of the input devices 214. The timeline controller 208 receives the input from the input devices 214 and requests navigation information across the machine controller 204. The dedicated machine components 206 responsible for navigation receives the request and contacts navigation services to receive updated navigation information and other corresponding machine status information. The navigation and machine status information is received by the dedicated machine components 206 and published to the machine controller 204. The timeline controller 208 receives and ingests the navigation and machine status information and generates timeline 106 updated based on the modifications by the user, which is presented to the user using one or more of the output devices 216.

FIGS. 3-8 illustrate various examples of the interactive user interface 100 through which interactions with the machine and related machine status information and user status information are provided. It will be appreciated by those skilled in the art that such depictions are exemplary only and not intended to be limiting.

Figure 3:
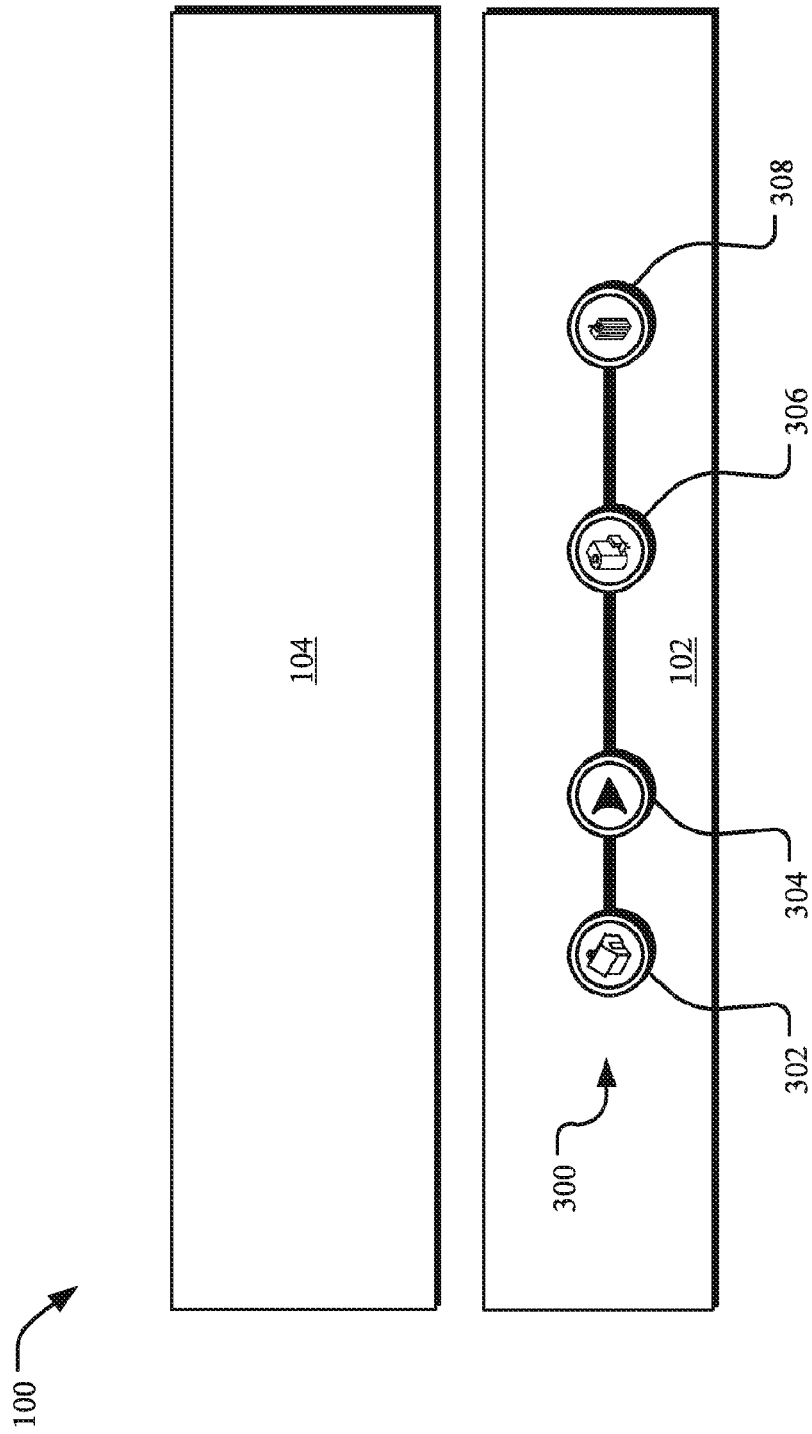
FIG. 3 illustrates the interactive user interface with a timeline of a travel path.

Turning first to FIG. 3, the interactive user interface 100 is illustrated with a timeline 300 of a travel path for an autonomous vehicle. In one implementation, the timeline 300 is displayed visually via the interactive dashboard interface 102. However, it will be appreciated that the timeline 300 may be displayed via the interactive window interface 104 and/or presented using other visual, audio, and/or tactile outputs. Further, the timeline 300 may be presented vertically, horizontally, curved, stacked, and/or with various other visual styles.

In one implementation, the timeline 300 presents an origination point 302, a current location 304 along a travel path to one or more destination points, such as a waypoint destination 306 and a final destination point 308. The timeline 300 may display an estimated time of arrival at the waypoint destination 306 and the final destination point 308. The timeline 300 shows progress as the vehicle travels along the travel path. In the example shown in FIG. 3, the user input daycare as the waypoint 306 and work as the final destination point 308, and the current location 304 shows that the vehicle is the process of traveling from the home as the origination point 302 to daycare as the waypoint 306.

The timeline 300 may also display user travel information (flight status, reservations, other transportation, etc.) and/or activity information (exercise, walking, running, etc.) for one or more users. For example, the timeline 300 may show that the user left home and went for a run, returned home, then left for daycare and work. As another example, the timeline 300 may show that the user left home to travel to the airport, walked to the departure gate, and flew to a destination. Such travel information and activity information may be obtained via a user device or over a network. The timeline 300 may display such travel information and activity information for multiple users on the timeline 300 diverging and reconnecting based on an overlap in information. For example, in the case of a carpool, the timeline 300 may display the timelines of the various passengers as joined during the travel and diverging for the time when they will exit the carpool and move onto other events and activities.

The timeline 300 may be visually displayed and interacted with using a variety of graphics, animations, and other aesthetic features. For example, the timeline 300 may include drag and drop bubbles to select options, add a destination point, remove a destination point, obtain additional detail, and/or the like. The example of the timeline 300 shown in FIG. 3 is a linear line with the origination point 302 and the destination points 306-308 as drag and drop bubbles positioned thereon with respect to duration and the current location 304 along the travel path. As the destination points 306 and 308 are reached they may be stacked for the user to browse the travel history.

It will be appreciated that the timeline 300 may be presented in a variety of manners. For example, the line may curve in three dimensions with the current location 304 centered and past and future aspects of the timeline 300 curving into space. In this case, the user may scroll through the history and future of the timeline 300 by swiping. The current location 304 may be displayed as moving along a fixed line in the timeline 300, with updates as destination points are reached, or the current location 304 may be displayed as centrally fixed with the line and information shown moving relative to the current location 304. The timeline 300 may include various other stylized animations and/or graphics to minor movement of the vehicle along the travel path. For example, an animated car may be shown driving along a surface of a globe to destination points.

Figure 4:
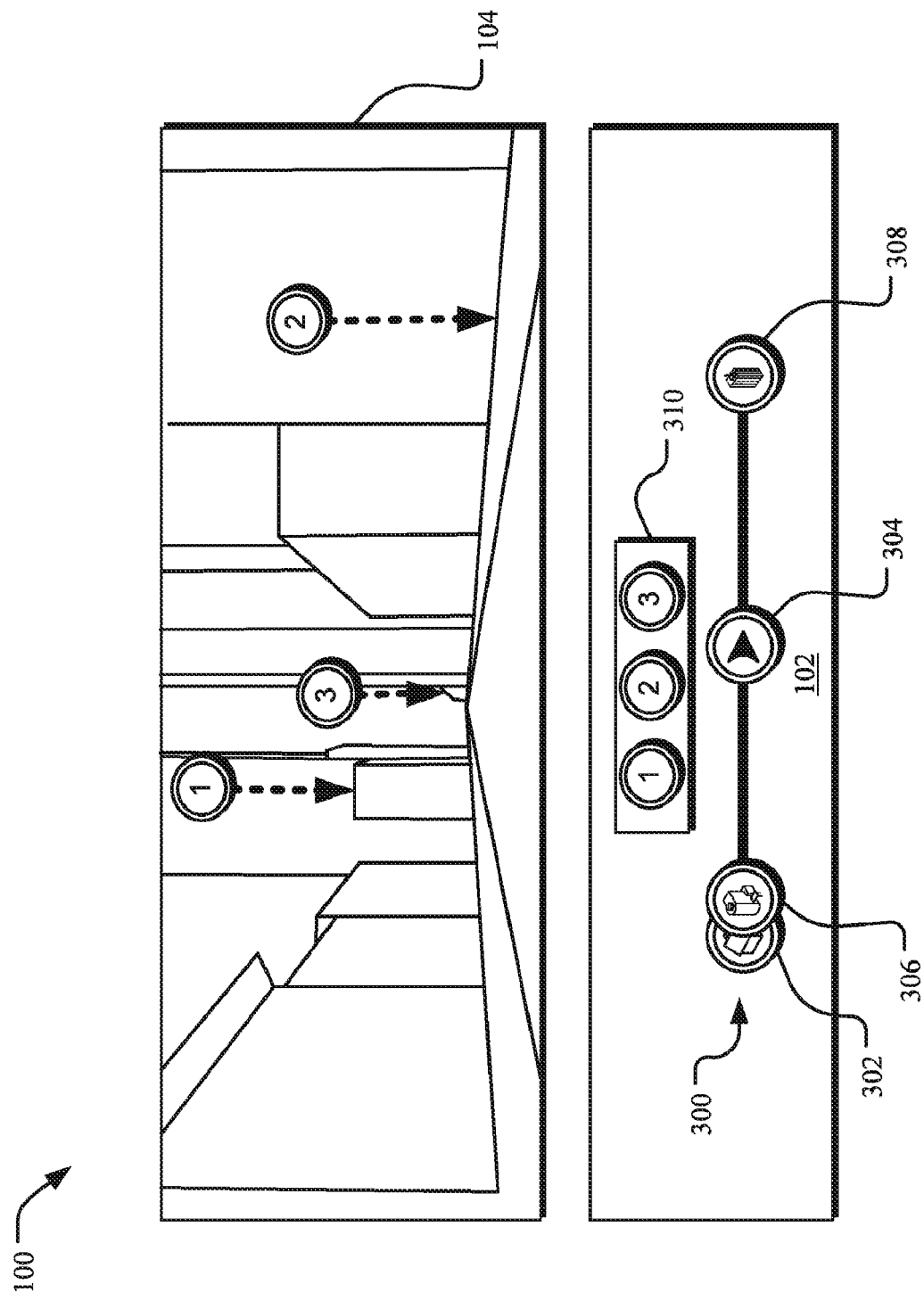
FIG. 4 illustrates the timeline with options for a waypoint destination presented for selection.
Figure 5:
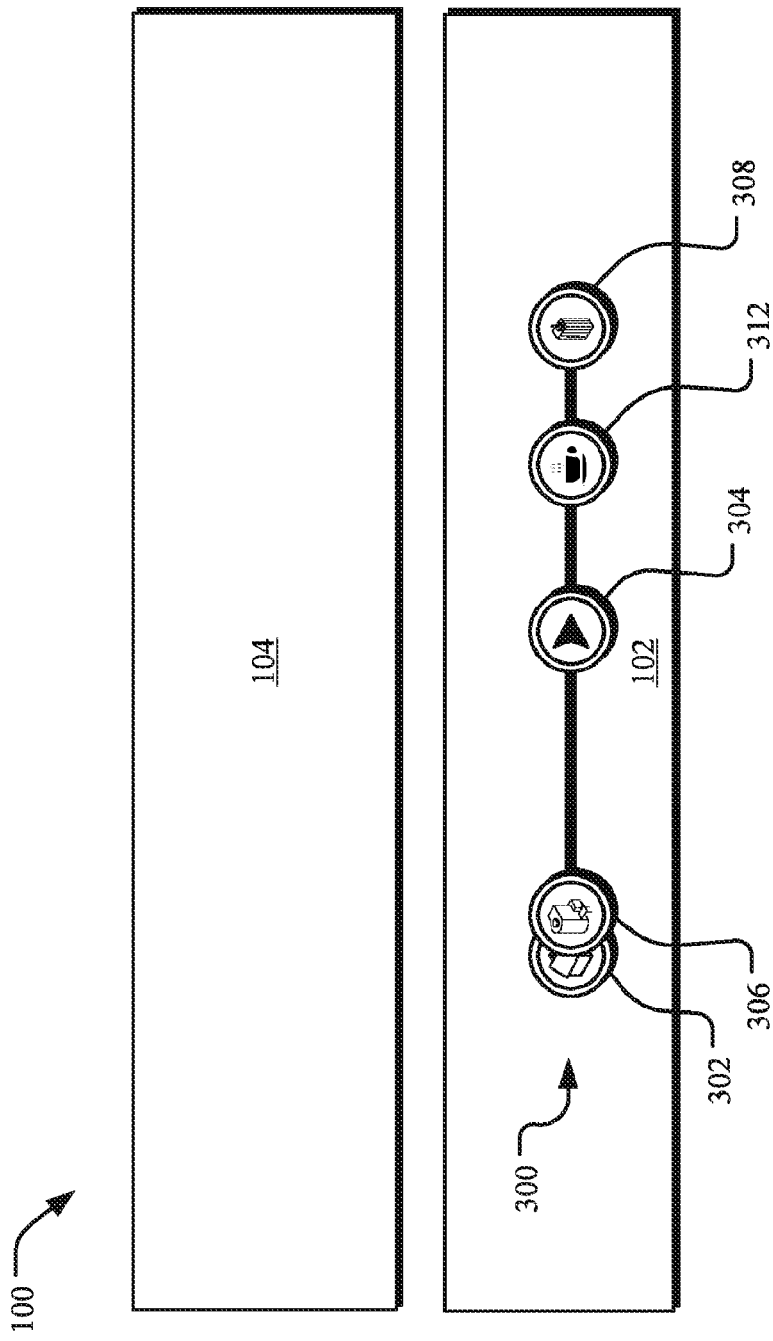
FIG. 5 shows the timeline updated based on the selection of a waypoint destination.

As described herein, the user may interact with the timeline 300, for example, by dynamically modifying the path of travel. In one implementation, the vehicle arrived at the waypoint 306 and the timeline 300 announced that the vehicle was arriving at daycare. For example, the timeline 300 may provide an audio and/or visual announcement (e.g., "Arriving at daycare"). The timeline 300 may then prompt the user regarding whether to continue along the travel path to the final destination point 308. As illustrated in FIG. 4, once the vehicle is traveling from the waypoint 306 to the final destination point 308, the waypoint 306 may be stacked with other previous points.

As further illustrated in FIG. 4, the user may interact with the timeline 300 to express an interest in stopping for coffee on the way to the final destination point 308. In one implementation, the timeline 300 may automatically provide coffee as a waypoint option based on user preferences or user history. In another implementation, the user may provide input requesting a stop for coffee. For example, the user may say "Find me coffee," and the timeline 300 may respond by saying "Sure. Let me check . . . ." The timeline 300 may then present options for coffee shops along the way to the final destination point 308.

The options may be displayed and selected in a variety of manners. For example, as shown in FIG. 4, the options may be presented in a message bubble 310 where the user can drag and drop one of the options onto the timeline 300 or tap one of the options for more information. Alternatively or additionally, the options may be projected into a field of view of the user through augmented reality using the interactive window interface 104. The options may show the locations of the options in the field of view, as shown in FIG. 4. To select one of the options, the user may point to one of the options.

Once one of the options is selected, a request is triggered to the machine controller 204 to update the routing information. While updated routing information is obtained, the timeline 300 may entertain the user or otherwise indicate that update is in progress using a variety of animations, such as an ellipsis, a pulsing or moving destination bubble, or the like. Once the routing information is updated, the timeline 300 will show the selected coffee option an additional waypoint destination 312 and the current location 304 relative to the additional waypoint destination 312. In one implementation, the timeline 300 automatically adjusts a visual scale of the travel path and updates the estimated time of arrival at the final destination point 312 accordingly. Once the vehicle arrives at the additional waypoint destination 312, the timeline 300 prompts the user to continue along the travel path to the final destination 308 and stacks the additional waypoint destination 312 with the other past destinations.

The timeline 300 may provide the user with various options or display detail regarding each of the destination points 306, 308, and 312 in response to input from the user. For example, the user may tap on the additional designation point 312 to receive reviews of the coffee shop, instruct the vehicle to park or drive to another destination point, call or send a message to a contact relating to the additional destination point 312, indicate when a contact is arriving at the additional destination point 312, and/or the like. In one implementation, the timeline 300 may be used to specify: a destination point to drop off a passenger; a destination point to park after dropping off the passenger; and a time and destination point (e.g., at the drop off destination point or another destination point) to pick up the passenger. Stated differently, a drop-off destination point for a passenger may not always be the final node of travel for the autonomous vehicle. The timeline 300 may be used to specify other activities and/or destination points for the autonomous vehicle to perform and/or travel to after the passengers have been dropped off at their destination point.

The timeline 300 may further provide a central location to present the user with information. For example, if a prescription becomes ready for pickup an option may be presented with the timeline 300 asking if the user would like to add an additional destination point to pick up the prescription or set a reminder for later.

As described herein, the timeline 300 may include calendar events and travel plans, so if a flight is delayed or a meeting is rescheduled, the timeline 300 may provide a notification to the user. Similarly, the timeline 300 may communicate with the user regarding whether the user will arrive on time for calendar events. If the timeline controller 208 determines that the user will be unable to make a steeled meeting on time, the timeline 300 may inform the user and provide options for contacting the meeting attendees with an estimated time of arrival or a suggestion for rescheduling.

Figure 6:
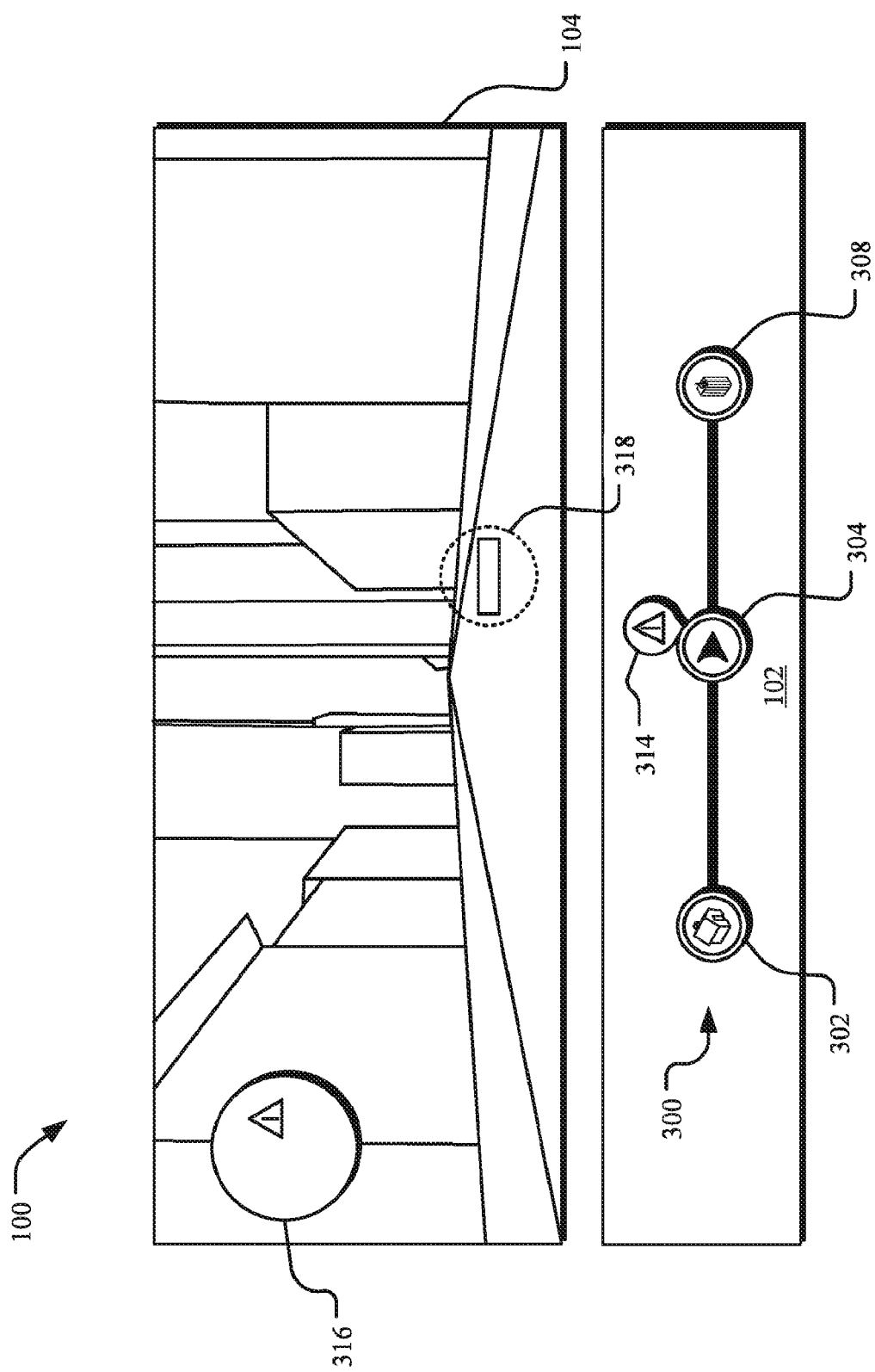
FIG. 6 illustrates a notification of an upcoming travel obstacle.
Figure 7:
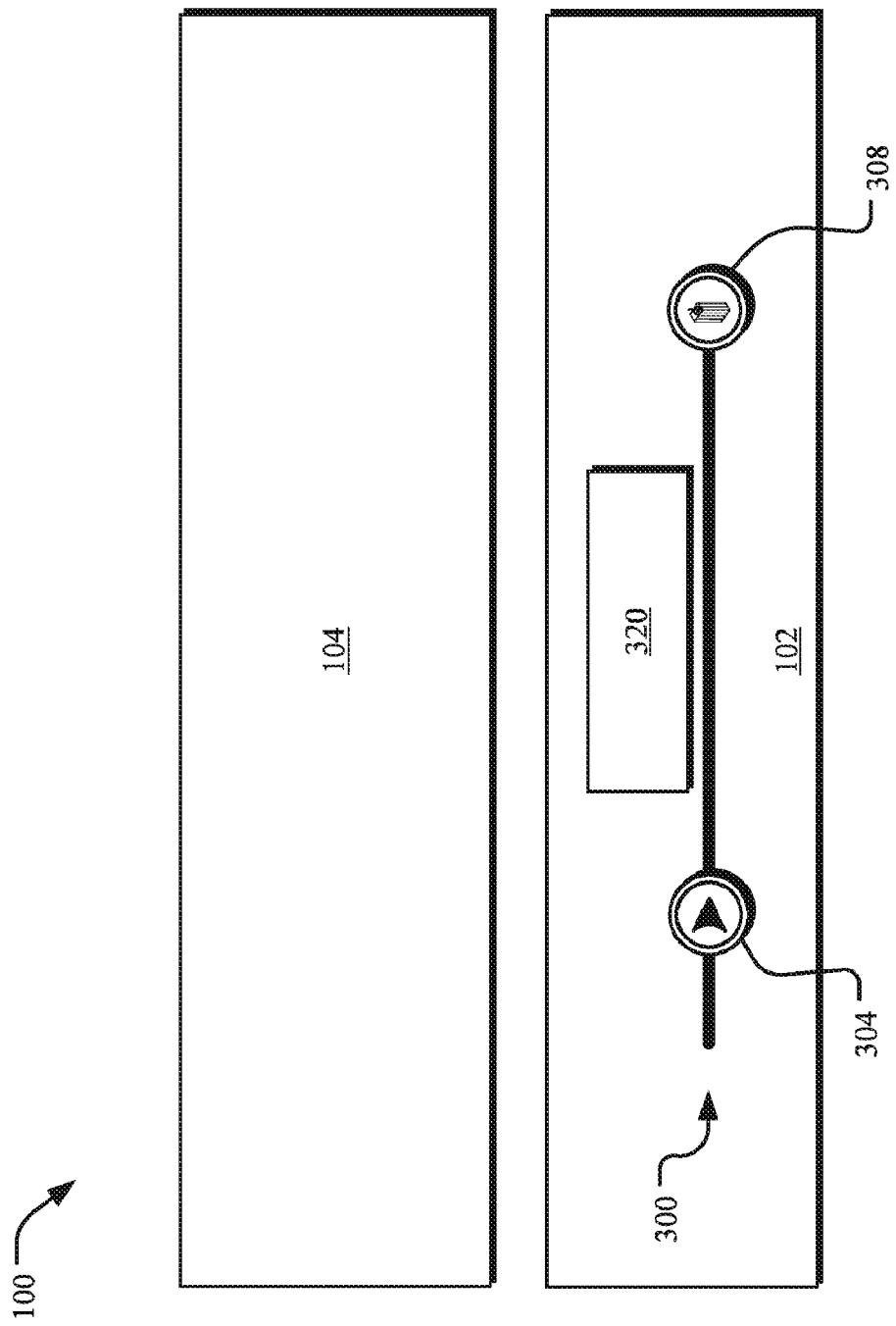
FIG. 7 shows the interactive user interface with route detail displayed.

Additionally, the timeline 300 may inform the user of any travel conditions along the travel path. For example, as illustrated in FIG. 6, the timeline 300 may provide a notification of an upcoming travel obstacle and inform the user that the vehicle is guiding around the obstacle. As shown in FIG. 6, the obstacle notification may include an alert bubble 314 indicating the current location 304 relative to the obstacle. The obstacle notification may additionally or alternatively provide a guiding bubble 316 showing more detail regarding the location of the obstacle relative to the vehicle. Once the obstacle is visible in the field of view, the interactive window interface 104 may circle, highlight, or otherwise show the user the obstacle with an obstacle identifier 318. Such notifications provide insight into actions of the vehicle while informing the user of when the obstacle is passed.

Figure 8:
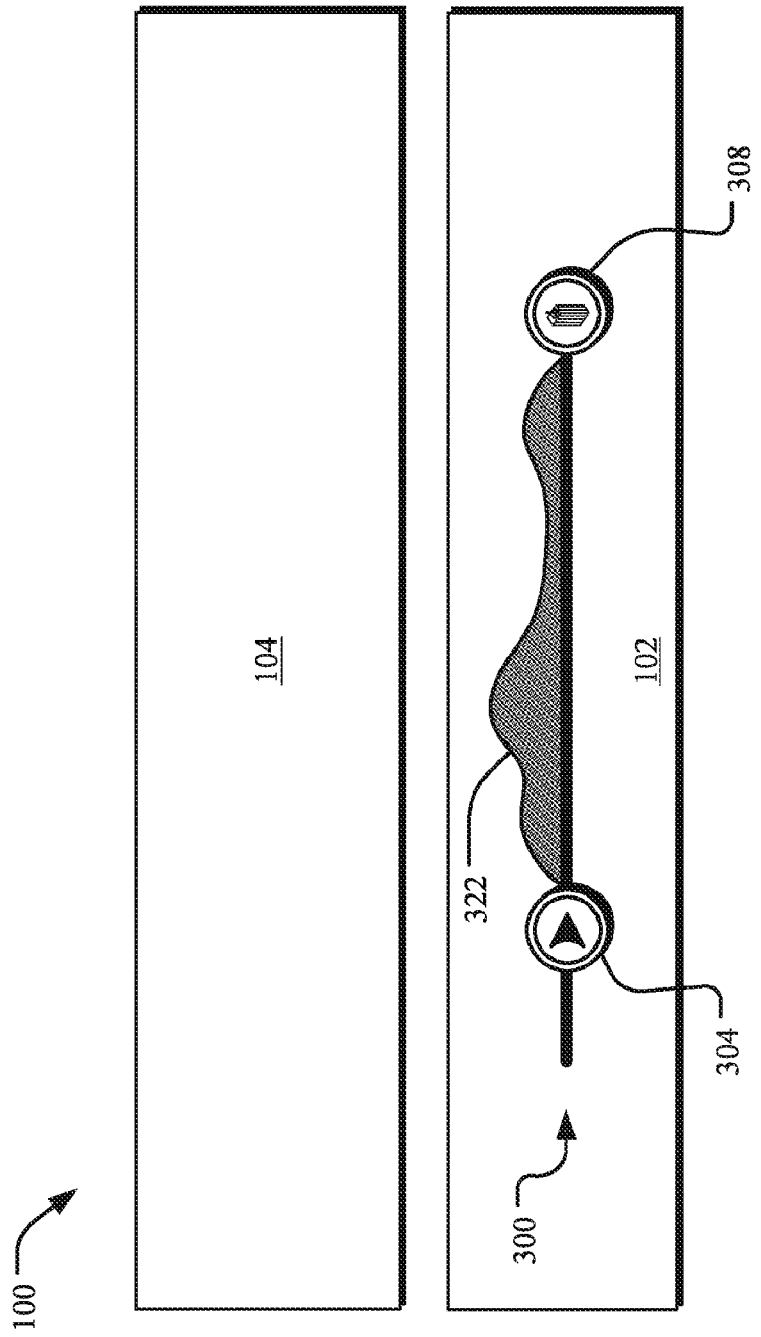
FIG. 8 shows travel information over a duration of time.

The timeline 300 may similarly inform the user of a traffic increase or other delays along the travel path. In one implementation, the timeline 300 includes color coding based on delay conditions. For example, red may indicate a presence of heavy traffic or other long delays. As can be understood from FIG. 7, in one implementation, the user may tap the delay sections of the timeline 300 to display a map 320 showing route and traffic details or other details pertaining to the delay. The timeline 300 may notify the user of a traffic increase and indicate that the vehicle is in the process of rerouting around the traffic or present the user with rerouting options. Once the route is changed, the timeline 300 is updated the scale and duration of the updated route reflected accordingly. In addition to displaying the map 320, sections of the timeline 300 may be expanded or collapsed to show more or less detail regarding the travel path or associated information. For example, as shown in FIG. 8, the timeline 300 may display duration information 322, such as a speed or energy used over time. The duration information 322 may be historical information between two points and/or predicted information between two points, such as the current location 304 and the final destination 308.

Figure 9:
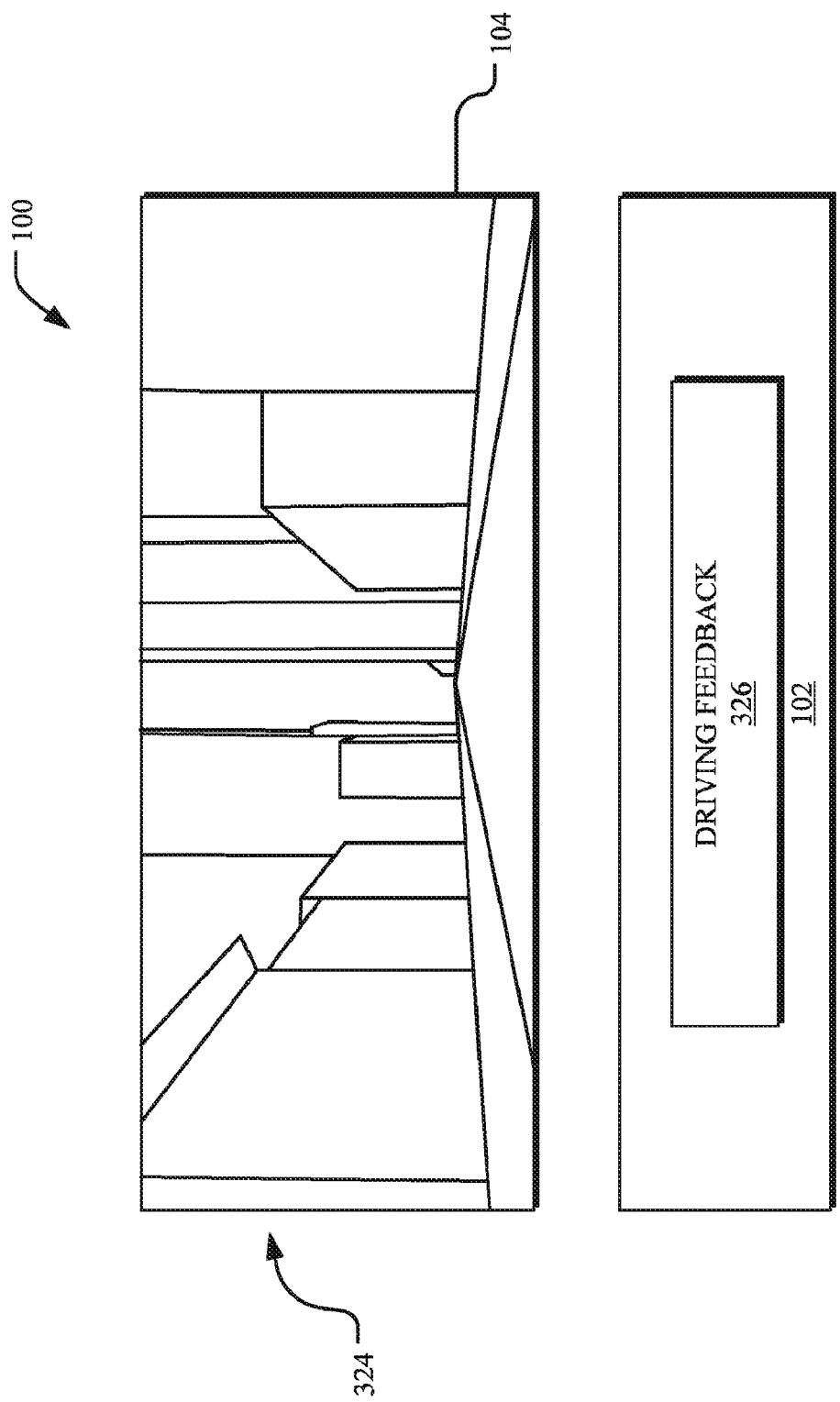
FIG. 9 illustrates the interactive user interface displaying a simulated environment for driving training.

Turning to FIG. 9, in one implementation, the interactive user interface 100 includes a virtual reality interface 324 presenting various interactive virtual features simulating a physical presence and experience. For example, the interactive windshield interface 104 may turn opaque, such that a user cannot see through the windshield, and display a simulated environment for a student to learn how to drive. In another example, the interactive windshield interface 104 may permit the transmission of light and overlay artificial elements through augmented reality as a learning course while the student is driving. In some cases, the interactive dashboard interface 102 provides driving feedback 326, including instructions, recommendations for improving technique, scoring, and/or the like.

Figure 10:
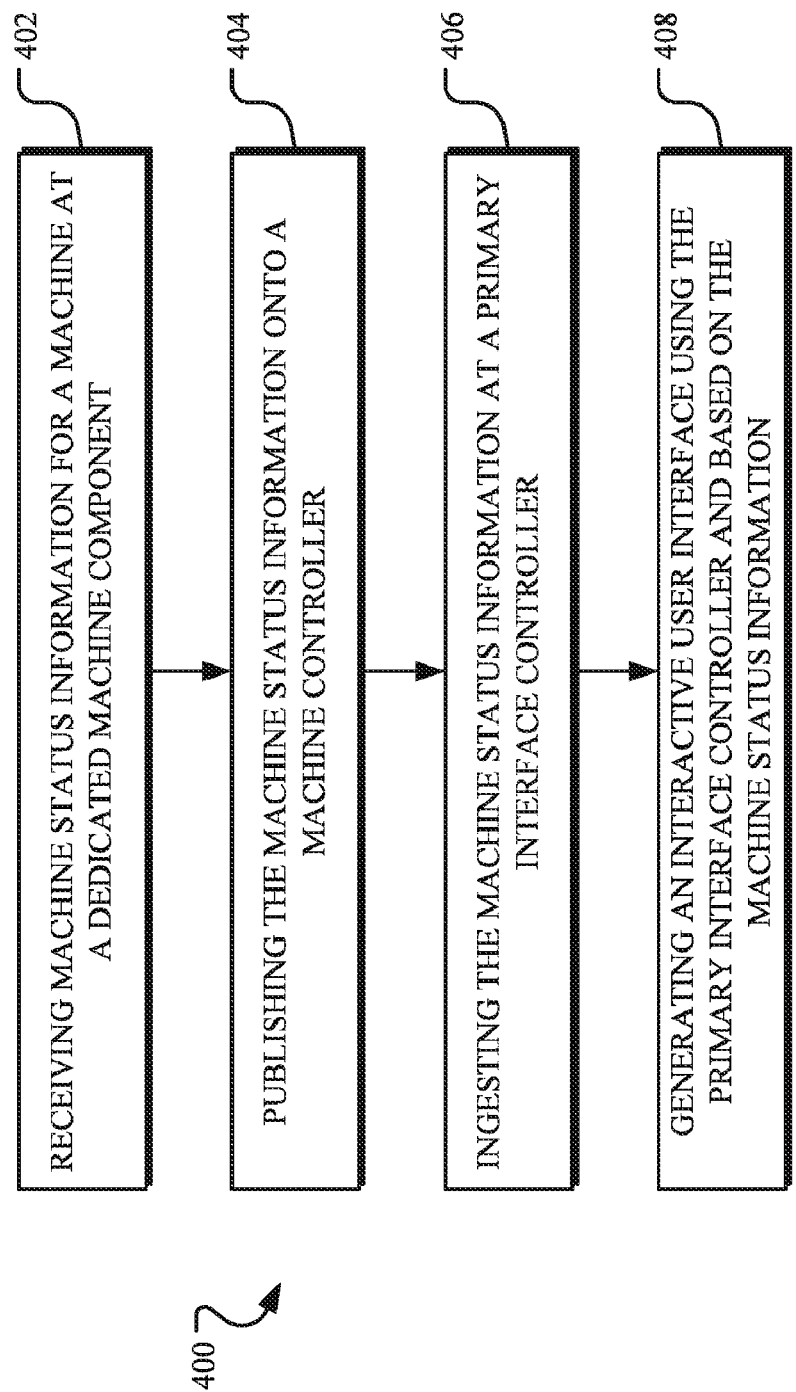
FIG. 10 illustrates example operations for interaction between a user and a machine.

FIG. 10 illustrates example operations 400 for interaction between a user and a machine. In one implementation, an operation 402 receives machine status information for the machine at a dedicated machine component. The machine may be any manned and unmanned autonomous machine, including, without limitation, robots, aerial vehicles, aerospace vehicles, submersible vehicles, ground vehicles, and the like, or any user device or other computing device. The machine status information may include, without limitation, navigation information, machine motion information, machine perception information, subsystems information, machine environment information, and/or the like. The navigation information may include any information pertain to a travel path of the machine from an origination point to one or more destination points. For example, the navigation information may include, without limitation, mapping information, location information, environmental condition information, and/or the like.

In one implementation, the operation 402 receives the machine status information at the dedicated machine component in response to a request by a primary interface controller over a machine controller. The request may be generated based on input by the user. For example, the input may include a modification to a travel path of the machine. The input from the user may be provided in the form of voice commands, gesture commands, tactile commands, and/or the like.

An operation 404 publishes the machine status information onto the machine controller. In one implementation, the machine controller is a distributed node system network of the machine, establishing a communications channel between the dedicated machine components and the primary interface controller.

An operation 406 ingests the machine status information at a primary interface controller, and an operation 408 generates an interactive user interface using the primary interface controller and based on the machine status information. In one implementation, the operation 406 further ingests user status information for the user at the primary controller, and the operation 408 further generates the interactive user interface based on the user status information. Input may be received from the user at the primary interface controller through the interactive user interface, and a corresponding action may be delegated to one or more subsystems of the machine using the machine controller.

In one implementation, the interactive user interface includes a timeline of the travel path of the machine. The timeline may include a duration, for example, in the form of an estimated time of arrival at each of the one or more destination points. The timeline may further include a current progress status of the machine along the travel path.

In another implementation, the interactive user interface includes travel conditions for the user. For example, the travel conditions may include upcoming traffic congestion, upcoming obstacles, inclement weather, upcoming road closures, delays pertaining to the travel path of the machine, user travel information (e.g., flight status, reservations, etc.), and/or the like.

In yet another implementation, the interactive user interface includes a communications layer for one or more messages exchanged between the user and the machine. The messages may be displayed visually, played as one or more sounds (e.g., spoken words), and/or the like. The messages may provide a status of the machine, inform the user of an autonomous decision of the machine, provide input from the user for impacting an operation of the machine, or inform the user of one or more tasks, among other information services. For example, a message (e.g., a message bubble) may be inserted into the timeline of the interactive user interface at a point corresponding to when the vehicle will be driving autonomously with a reminder to perform a tasks (e.g., make a call, send a message to a contact, etc.).

In still another implementation, the interactive user interface includes one or more indications of an action of the machine. The action may be a present action or a future action and may involve, without limitation, movement of the machine, a location of the machine along a path of travel, and/or an autonomous decision of the machine. The one or more indications may include a gradual indication and/or an action indication and may be audio, visual, and/or tactile.

Figure 11:
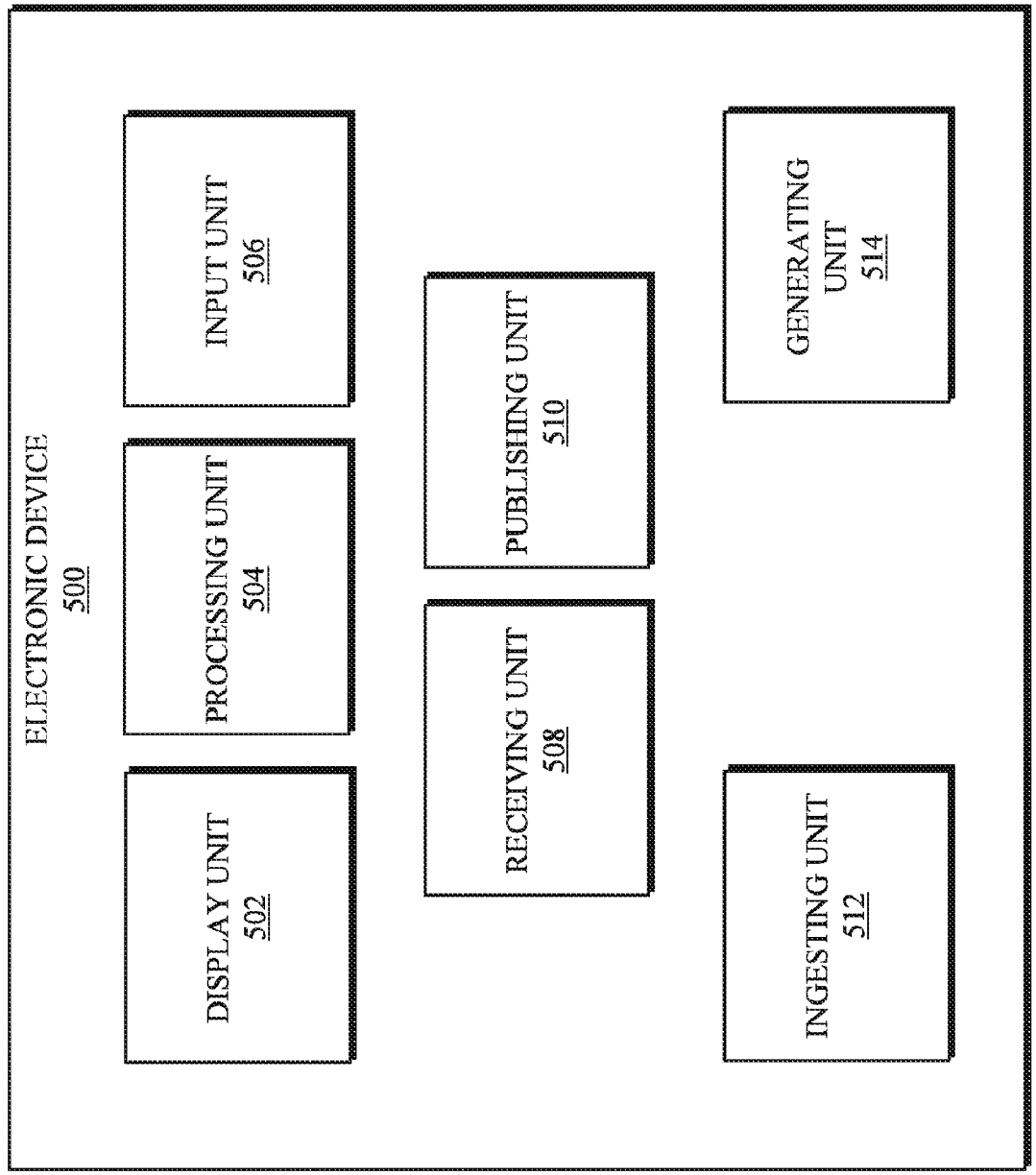
FIG. 11 is a functional block diagram of an electronic device including operational units arranged to perform various operations of the presently disclosed technology.

Turning to FIG. 11, an electronic device 500 including operational units 502-514 arranged to perform various operations of the presently disclosed technology is shown. The operational units 502-514 of the device 500 are implemented by hardware or a combination of hardware and software to carry out the principles of the present disclosure. It will be understood by persons of skill in the art that the operational units 502-514 described in FIG. 11 may be combined or separated into sub-blocks to implement the principles of the present disclosure. Therefore, the description herein supports any possible combination or separation or further definition of the operational units 502-514.

In one implementation, the electronic device 500 includes a display unit 502 to display information, such as the interactive user interface 100 or other graphical user interface via the display devices 216, and a processing unit 504 in communication with the display unit 502 and an input unit 506 to receive data from one or more input devices or systems, such as the input devices 214. Various operations described herein may be implemented by the processing unit 504 using data received by the input unit 506 to output information for display using the display unit 502.

Additionally or alternatively, the electronic device 500 may include a receiving unit 508, a publishing unit 510, an ingesting unit 512, and a generating unit 514. The receiving unit 508 receives machine status information for a machine, such as an autonomous vehicle. The publishing unit 510 publishes the machine status information onto a machine controller, such as a distributed node system network. The ingesting unit 512 ingests the machine status information, and the generating unit 514 generates an interactive user interface using the machine status information.

In another implementation, the electronic device 500 includes units implementing the operations described with respect to FIG. 10. For example, the operation 402 may be implemented by the receiving unit 508, the operation 404 may be implemented by the publishing unit 510, the operation 406 may be implemented by the ingesting unit 512, and the operation 408 may be implemented by the generating unit 514.

Figure 12:
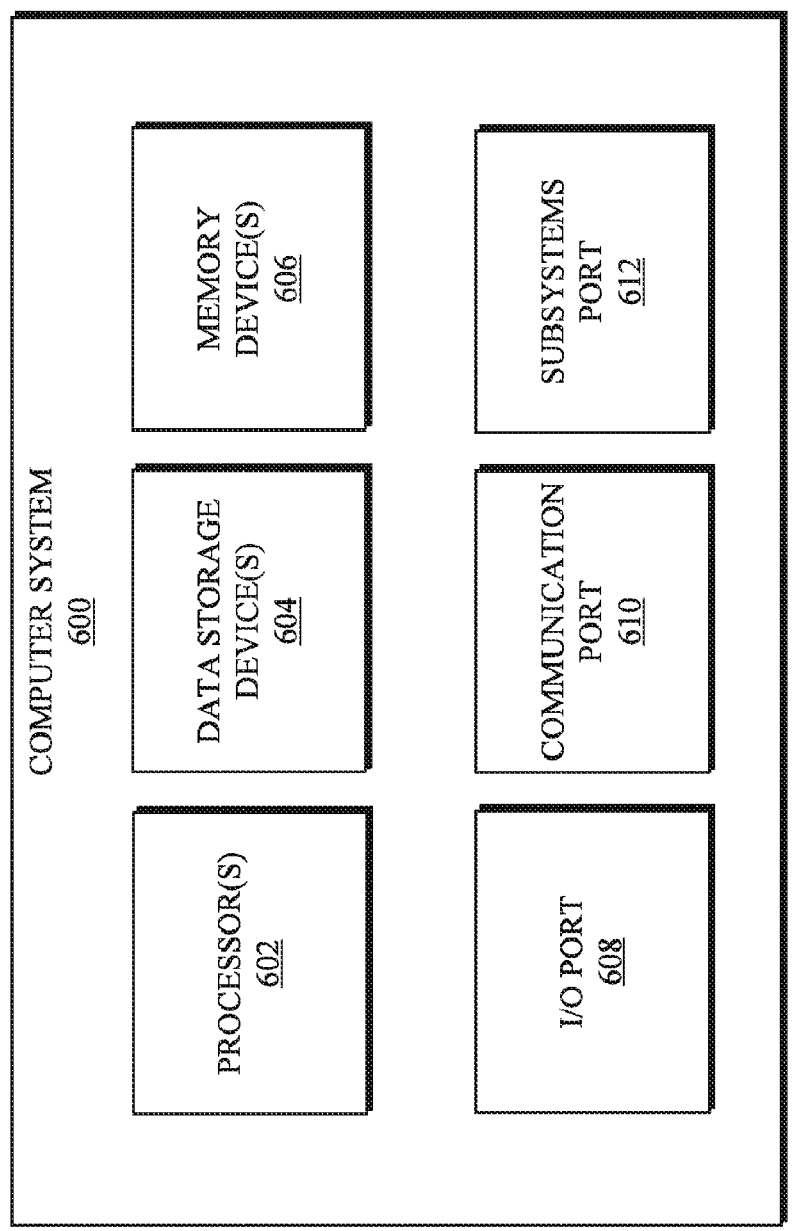
FIG. 12 is an example computing system that may implement various systems and methods of the presently disclosed technology.

Referring to FIG. 12, a detailed description of an example computing system 600 having one or more computing units that may implement various systems and methods discussed herein is provided. The computing system 600 may be applicable to the primary interface controller 202, the machine controller 204, the dedicated machine components 206, the input devices 214, the output devices 216, the server 222, and other computing or network devices. It will be appreciated that specific implementations of these devices may be of differing possible specific computing architectures not all of which are specifically discussed herein but will be understood by those of ordinary skill in the art.

The computer system 600 may be a computing system is capable of executing a computer program product to execute a computer process. Data and program files may be input to the computer system 600, which reads the files and executes the programs therein. Some of the elements of the computer system 600 are shown in FIG. 6, including one or more hardware processors 602, one or more data storage devices 604, one or more memory devices 606, and/or one or more ports 608-612. Additionally, other elements that will be recognized by those skilled in the art may be included in the computing system 600 but are not explicitly depicted in FIG. 6 or discussed further herein. Various elements of the computer system 600 may communicate with one another by way of one or more communication buses, point-to-point communication paths, or other communication means not explicitly depicted in FIG. 6.

The processor 602 may include, for example, a central processing unit (CPU), a microprocessor, a microcontroller, a digital signal processor (DSP), and/or one or more internal levels of cache. There may be one or more processors 602, such that the processor 602 comprises a single central-processing unit, or a plurality of processing units capable of executing instructions and performing operations in parallel with each other, commonly referred to as a parallel processing environment.

The computer system 600 may be a conventional computer, a distributed computer, or any other type of computer, such as one or more external computers made available via a cloud computing architecture. The presently described technology is optionally implemented in software stored on the data stored device(s) 604, stored on the memory device(s) 606, and/or communicated via one or more of the ports 608-612, thereby transforming the computer system 600 in FIG. 12 to a special purpose machine for implementing the operations described herein. Examples of the computer system 600 include personal computers, terminals, workstations, mobile phones, tablets, laptops, personal computers, multimedia consoles, gaming consoles, set top boxes, and the like.

The one or more data storage devices 604 may include any non-volatile data storage device capable of storing data generated or employed within the computing system 600, such as computer executable instructions for performing a computer process, which may include instructions of both application programs and an operating system (OS) that manages the various components of the computing system 600. The data storage devices 604 may include, without limitation, magnetic disk drives, optical disk drives, solid state drives (SSDs), flash drives, and the like. The data storage devices 604 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 604 and/or the memory devices 606, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 600 includes one or more ports, such as an input/output (I/O) port 608, a communication port 610, and a subsystems port 612, for communicating with other computing, network, or vehicle devices. It will be appreciated that the ports 608-612 may be combined or separate and that more or fewer ports may be included in the computer system 600.

The I/O port 608 may be connected to an I/O device, or other device, by which information is input to or output from the computing system 600. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 600 via the I/O port 608. Similarly, the output devices may convert electrical signals received from computing system 600 via the I/O port 608 into signals that may be sensed as output by a human, such as sound, light, and/or touch. The input device may be an alphanumeric input device, including alphanumeric and other keys for communicating information and/or command selections to the processor 602 via the I/O port 608. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 600 via the I/O port 608. For example, an electrical signal generated within the computing system 600 may be converted to another type of signal, and/or vice-versa. In one implementation, the environment transducer devices sense characteristics or aspects of an environment local to or remote from the computing device 600, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 600, such as, physical movement of some object (e.g., a mechanical actuator), heating or cooling of a substance, adding a chemical substance, and/or the like.

In one implementation, a communication port 610 is connected to a network by way of which the computer system 600 may receive network data useful in executing the methods and systems set out herein as well as transmitting information and network configuration changes determined thereby. Stated differently, the communication port 610 connects the computer system 600 to one or more communication interface devices configured to transmit and/or receive information between the computing system 600 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 610 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 610 may communicate with an antenna or other link for electromagnetic signal transmission and/or reception. In some examples, an antenna may be employed to receive Global Positioning System (GPS) data to facilitate determination of a location of a machine, vehicle, or another device.

The computer system 600 may include a subsystems port 612 for communicating with one or more systems related to a vehicle to control an operation of the vehicle and/or exchange information between the computer system 600 and one or more subsystems of the vehicle. Examples of such subsystems of a vehicle, include, without limitation, imaging systems, radar, lidar, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, machine status information, user status information, the interactive user interface 100, and software and other modules and services may be embodied by instructions stored on the data storage devices 604 and/or the memory devices 606 and executed by the processor 602. The computer system 600 may be integrated with or otherwise form part of a vehicle. In some instances, the computer system 600 is a portable device that may be in communication and working in conjunction with various systems or subsystems of a vehicle.

The present disclosure recognizes that the use of information discussed herein may be used to the benefit of users. For example, machine status information, including navigation information, may be used to facilitate user understanding of statuses, actions, and decisions of an autonomous machine, and the navigation information may be used to provide targeted information concerning a "best" path or route to the vehicle. Use of such information enables calculated control of an autonomous vehicle, while providing the user with a simple and intuitive interactive interface related thereto. Moreover, the user status information may be used to provide an optimized user travel experience and management of travel, activities, tasks, and scheduling. Further, other uses for machine status information and user status information that benefit a user are also contemplated by the present disclosure.

Users can selectively block use of, or access to, personal data, such as location and user status information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 12 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for interaction with an autonomous vehicle, the method comprising:
   identifying one or more autonomous decisions of the autonomous vehicle;
   determining whether the one or more autonomous decisions correspond to an upcoming action or a series of actions over a duration of time, the series of actions including the autonomous vehicle traveling along a travel path from an origin towards a destination and the duration of time corresponding to a travel time for the travel path;
   generating an indications interface having at least one indication based on whether the one or more autonomous decisions correspond to the upcoming action or the series of actions over the duration of time, the at least one indication including a gradual indication where the one or more autonomous decisions correspond to the series of actions over the duration of time; and
   presenting the indications interface using at least one output device of an interactive interface of the autonomous vehicle, the at least one indication presented in connection with the one or more autonomous decisions, presentation of the gradual indication including a display changing over the duration of time as the autonomous vehicle travels along the travel path towards the destination, wherein the display changing over the duration of time comprises light changing over the duration of time.

2. The method of claim 1, wherein the at least one indication includes an action indication where the one or more autonomous decisions correspond to the upcoming action.

3. The method of claim 2, wherein the action indication is presented in connection with the upcoming action.

4. The method of claim 2, wherein the upcoming action involves a movement of the autonomous vehicle.

5. The method of claim 4, wherein the action indication includes a visual indication of a direction of the movement of the autonomous vehicle.

6. The method of claim 1, wherein the upcoming action corresponds to a travel condition, the at least one indication including information pertaining to the travel condition.

7. The method of claim 6, wherein the travel condition includes a low battery charge of the autonomous vehicle, the upcoming action including navigating to a charging station.

8. The method of claim 6, wherein the travel condition includes one or more of: upcoming traffic congestion along a travel path of the autonomous vehicle, upcoming obstacles along the travel path, inclement weather in a vicinity of the travel path, upcoming road closures along the travel path, and delays pertaining to the travel path, the upcoming action including rerouting the travel path.

9. The method of claim 1, wherein the light changing over the duration of time comprises a color changing.

10. The method of claim 1, wherein the light changing over the duration of time comprises a change from a first state to a second state.

11. One or more tangible non-transitory computer-readable storage media storing computer-executable instructions for performing a computer process on a computing system, the computer process comprising:
    identifying one or more autonomous decisions of an autonomous vehicle;
    determining whether the one or more autonomous decisions correspond to an upcoming action or a series of actions over a duration of time, the series of actions including the autonomous vehicle traveling along a travel path from an origin towards a destination and the duration of time corresponding to a travel time for the travel path;
    generating an indications interface having at least one indication based on whether the one or more autonomous decisions correspond to the upcoming action or the series of actions over the duration of time, the at least one indication including a gradual indication where the one or more autonomous decisions correspond to the series of actions over the duration of time; and
    outputting the indications interface for presentation using at least one output device of an interactive interface of the autonomous vehicle, the at least one indication presented in connection with the one or more autonomous decisions, presentation of the gradual indication including a display changing over the duration of time as the autonomous vehicle travels along the travel path towards the destination, wherein the display changing over the duration of time comprises light changing over the duration of time.

12. The one or more tangible non-transitory computer-readable storage media of claim 11, wherein the at least one indication includes an action indication where the one or more autonomous decisions correspond to the upcoming action.

13. The one or more tangible non-transitory computer-readable storage media of claim 12, wherein the upcoming action involves a movement of the autonomous vehicle, the action indication corresponding to the movement of the autonomous vehicle.

14. The one or more tangible non-transitory computer-readable storage media of claim 11, wherein the upcoming action corresponds to a travel condition, the at least one indication including information pertaining to the travel condition.

15. The one or more tangible non-transitory computer-readable storage media of claim 11, wherein the upcoming action corresponds to a travel condition, the at least one indication including information pertaining to the travel condition.

16. A system for interaction with an autonomous vehicle, the system comprising:
    a primary interface controller generating an indications interface having at least one indication based on whether one or more autonomous decisions of the autonomous vehicle correspond to an upcoming action or a series of actions over a duration of time, the series of actions including the autonomous vehicle traveling along a travel path from an origin towards a destination and the duration of time corresponding to a travel time for the travel path, the at least one indication including a gradual indication where the one or more autonomous decisions correspond to the series of actions over the duration of time; and at least one output device of an interactive interface of the autonomous vehicle in communication with the primary interface controller, the at least one output device presenting the indications interface with the at least one indication presented in connection with the one or more autonomous decisions, presentation of the gradual indication including a display changing over the duration of time as the autonomous vehicle travels along the travel path towards the destination, wherein the display changing over the duration of time comprises light changing over the duration of time.

17. The system of claim 16, wherein the at least one indication includes an action indication where the one or more autonomous decisions correspond to the upcoming action.

18. The system of claim 17, wherein the action indication includes moving at least one object in connection with the movement of the autonomous vehicle.

19. The system of claim 17, wherein the upcoming action involves a movement of the autonomous vehicle, the action indication corresponding to the movement of the autonomous vehicle.

20. The system of claim 16, wherein the upcoming action corresponds to a travel condition, the at least one indication including information pertaining to the travel condition.

* * * * *